United States Patent
Park

(10) Patent No.: US 10,352,435 B2
(45) Date of Patent: Jul. 16, 2019

(54) INTEGRATED ELECTRONIC SHIFT LEVER ASSEMBLY FOR VEHICLE

(71) Applicant: HYUNDAI MOTOR COMPANY, Seoul (KR)

(72) Inventor: Han-Gil Park, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 754 days.

(21) Appl. No.: 14/880,032

(22) Filed: Oct. 9, 2015

(65) Prior Publication Data
US 2016/0178050 A1  Jun. 23, 2016

(30) Foreign Application Priority Data
Dec. 23, 2014 (KR) .................. 10-2014-0187002

(51) Int. Cl.
*F16H 59/02* (2006.01)
*F16H 59/10* (2006.01)

(52) U.S. Cl.
CPC ..... *F16H 59/0204* (2013.01); *F16H 59/0278* (2013.01); *F16H 59/105* (2013.01); *F16H 2059/0221* (2013.01); *F16H 2059/0282* (2013.01)

(58) Field of Classification Search
CPC ............ F16H 59/0204; F16H 59/0278; F16H 59/105; F16H 2059/0221; F16H 2059/0282
USPC ................. 74/473.3–473.33; 200/43.01, 336
See application file for complete search history.

(56) References Cited

U.S. PATENT DOCUMENTS

| | | | | |
|---|---|---|---|---|
| 2,917,942 A * | 12/1959 | Jarrett | ....................... | G05G 5/06 338/130 |
| 4,779,305 A * | 10/1988 | Gorsek | ................... | G05G 1/082 16/441 |
| 5,442,974 A * | 8/1995 | Sugimoto | .............. | B60K 37/06 200/61.88 |
| 6,080,082 A * | 6/2000 | Steeby | ................... | B60W 10/06 477/107 |
| 6,427,553 B1 * | 8/2002 | Hogberg | ............. | F16H 59/0204 200/5 R |
| 6,443,083 B2 * | 9/2002 | Muller | ................. | B63H 21/213 114/144 RE |

(Continued)

FOREIGN PATENT DOCUMENTS

| | | |
|---|---|---|
| JP | 05-030603 U | 4/1993 |
| JP | 8-142873 | * 6/1996 |

(Continued)

*Primary Examiner* — William C Joyce
(74) *Attorney, Agent, or Firm* — Morgan Lewis & Bockius LLP

(57) ABSTRACT

An integrated electronic shift lever assembly for a vehicle includes a shift lever installed inside the vehicle and operated by a driver for a shift position operation. A fixed knob is fixedly attached to an end of the shift lever. A shaft extends outwards from the fixed knob. A movable knob is detachably connected to the fixed knob such that the movable knob slides along the shaft to be decoupled from the fixed knob and rotates about the fixed knob. When a signal according to a rotational direction of the movable knob is input to a transmission control unit (TCU), the TCU changes a current shift position or a drive mode.

14 Claims, 9 Drawing Sheets

(56) References Cited

U.S. PATENT DOCUMENTS

| | | | |
|---|---|---|---|
| 6,621,176 B1* | 9/2003 | Nagasaka | B60K 31/042 |
| | | | 200/61.91 |
| 8,955,405 B2* | 2/2015 | Heo | F16H 59/04 |
| | | | 74/473.18 |
| 2003/0000763 A1* | 1/2003 | Colling | B60K 20/06 |
| | | | 180/333 |
| 2004/0159175 A1 | 8/2004 | Chen | |
| 2005/0034557 A1 | 2/2005 | Anderbrugge et al. | |
| 2008/0184841 A1 | 8/2008 | Blind et al. | |
| 2012/0291579 A1* | 11/2012 | Kamoshida | F16H 59/0204 |
| | | | 74/473.3 |

FOREIGN PATENT DOCUMENTS

| | | |
|---|---|---|
| JP | 2000-309232 A | 11/2000 |
| JP | 2008-044540 A | 2/2008 |
| KR | 10-2005-0011524 A | 1/2005 |
| KR | 10-2013-0061903 A | 6/2013 |
| KR | 10-1305787 B1 | 9/2013 |
| KR | 10-2014-0076050 A | 6/2014 |

* cited by examiner

-- Related Art --

-- Related Art --

INTEGRATED ELECTRONIC SHIFT LEVER ASSEMBLY FOR VEHICLE

CROSS-REFERENCE TO RELATED APPLICATIONS

This application claims the benefit of priority to Korean Patent Application No. 10-2014-0187002, filed on Dec. 23, 2014, which is incorporated herein by reference in its entirety.

TECHNICAL FIELD

The present disclosure relates to a shift lever for transferring a driver's intention to shift gears to an automatic transmission in a vehicle having the automatic transmission, and more particularly, to an integrated electronic shift lever assembly for a vehicle, which enables a position change (P-R-N-D) in a typical shift mode and an up/down-shift (+/−) in a manual mode through one shift lever or enables a shift operation and a change of a drive mode.

BACKGROUND

A vehicle has a shift lever to shift gears to a transmission inside the vehicle.

A driver transfers a driver's intention to shift gears, such as a parking (P) position, a reverse (R) position, a neutral (N) position, or a drive (D) position, to the transmission using the shift lever, and a transmission control unit (TCU) in the vehicle operates the transmission through values input from the shift lever and states of the vehicle.

Even in an automatic transmission, a manual mode in which a shift position of a traveling vehicle becomes high or low by a driver's intention is recently realized through the shift lever, in addition to a typical gear shifting mode (hereinafter, referred to as "typical shift mode") in which P-R-N-D positions are changed.

As shown in FIGS. 1 and 2, a shift lever changes a current shift position to a higher shift position (+) or a lower shift position (−) according to a driver's intention after entering a manual mode from the D position through an operation in a different direction from an operation direction in a typical shift mode.

That is, the shift lever is operated in a forward and backward direction of the vehicle in the typical shift mode. Then, the current shift position is changed to a higher shift position (+) or a lower shift position (−) such that the shift lever enters the manual mode from the D position through the operation in a width direction of the vehicle and is then operated again in the forward and backward direction of the vehicle.

Here, the shift lever rotates about an axis of rotation S within a predetermined angle range, as shown in FIG. 1, so as to enter the manual mode from the D position or otherwise return to the D position from the manual mode. For example, when a shift lever 110 rotates about the axis of rotation to be positioned on line II-II in a state in which the shift lever 110 is position on line I-I to be in the D position in FIG. 1, a shift lever-side engagement part 111 formed at one side of the shift lever 110 is coupled to an engagement part 121 of a select lock 120. Here, when a driver operates the shift lever 110, the operation force of the shift lever is transferred to the select lock 120. Consequently, the transmission of the vehicle is shifted according to a driver's intention to shift gears.

On the other hand, the shift lever may also enter or return from the manual mode through the operation of a separate button provided in the vicinity of the shift lever.

However, it is necessary to sufficiently space the above conventional vehicle shift lever 110 from a console or the like in the vehicle. In addition, since the shift lever 110 protrudes to a vehicle interior in terms of design, there is a limit to the aesthetic configuration of the vehicle interior.

SUMMARY

An aspect of the present inventive concept is directed to an integrated electronic shift lever assembly for a vehicle, which easily changes a shift mode from a typical shift mode to a manual mode through a simple operation or changes a drive mode. In addition, the integrated electronic shift lever assembly can provide a reduced size and a reduced number of components constituting the same.

Other objects and advantages of the present inventive concept can be understood by the following description, and become apparent with reference to the embodiments of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, an integrated electronic shift lever assembly for a vehicle includes a shift lever installed inside the vehicle and operated by a driver for a shift position (P position-R position-N position-D position) operation. A fixed knob is fixedly mounted to an end of the shift lever. A shaft extends outwards from the fixed knob. A movable knob is detachably connected to the fixed knob such that the movable knob slides along the shaft to be decoupled from the fixed knob and rotates about the fixed knob. When a signal according to a rotational direction of the movable knob is input to a transmission control unit (TCU), the TCU changes a current shift position or a drive mode.

The movable knob may rotate about the shaft which is fixedly mounted to the fixed knob.

The shaft may be rotatably mounted to the fixed knob, and the movable knob may rotate along with the shaft.

When the movable knob rotates, a current shift position may be changed to a higher or lower shift position than the current shift position.

When the movable knob rotates, the drive mode may be selected.

The drive mode may include a normal mode, an eco mode, a manual mode, and a snow mode.

A locking unit for preventing rotation of the movable knob and locking the movable knob to the fixed knob may be formed at a contact portion between the fixed knob and the movable knob.

The locking unit may include a locking groove formed on the fixed knob, and a locking protrusion formed on the movable knob to be inserted into the locking groove.

A rotation recognition unit for recognizing rotation of the movable knob may be provided in the shaft or the movable knob.

The rotation recognition unit may be provided in plural numbers to recognize the rotation of the movable knob according to the rotation direction of the movable knob and operated according to the rotation direction of the movable knob.

The rotation recognition unit may be a Hall-effect sensor integrated circuit (IC).

The rotation recognition unit may be a tact switch.

The rotation recognition unit may be a rubber switch.

The rotation recognition unit may be a proximity sensor.

One of the movable knob and the shaft may have a contactor, and the other of the movable knob and the shaft may have contacts which come into contact with the contactor according to the rotation direction of the movable knob so that the signals according to the rotation direction of the movable knob are output therefrom.

The shaft may have a rail formed in a longitudinal direction of the shaft. The movable knob may have a guide, which is formed on an inner side surface thereof and engages with the rail, and may move in the longitudinal direction of the shaft.

The shaft may further include an indicator exposed to outside when the movable knob is decoupled from the fixed knob to display the current shift position or the drive mode.

DESCRIPTION OF SPECIFIC EMBODIMENTS

Figure 1:
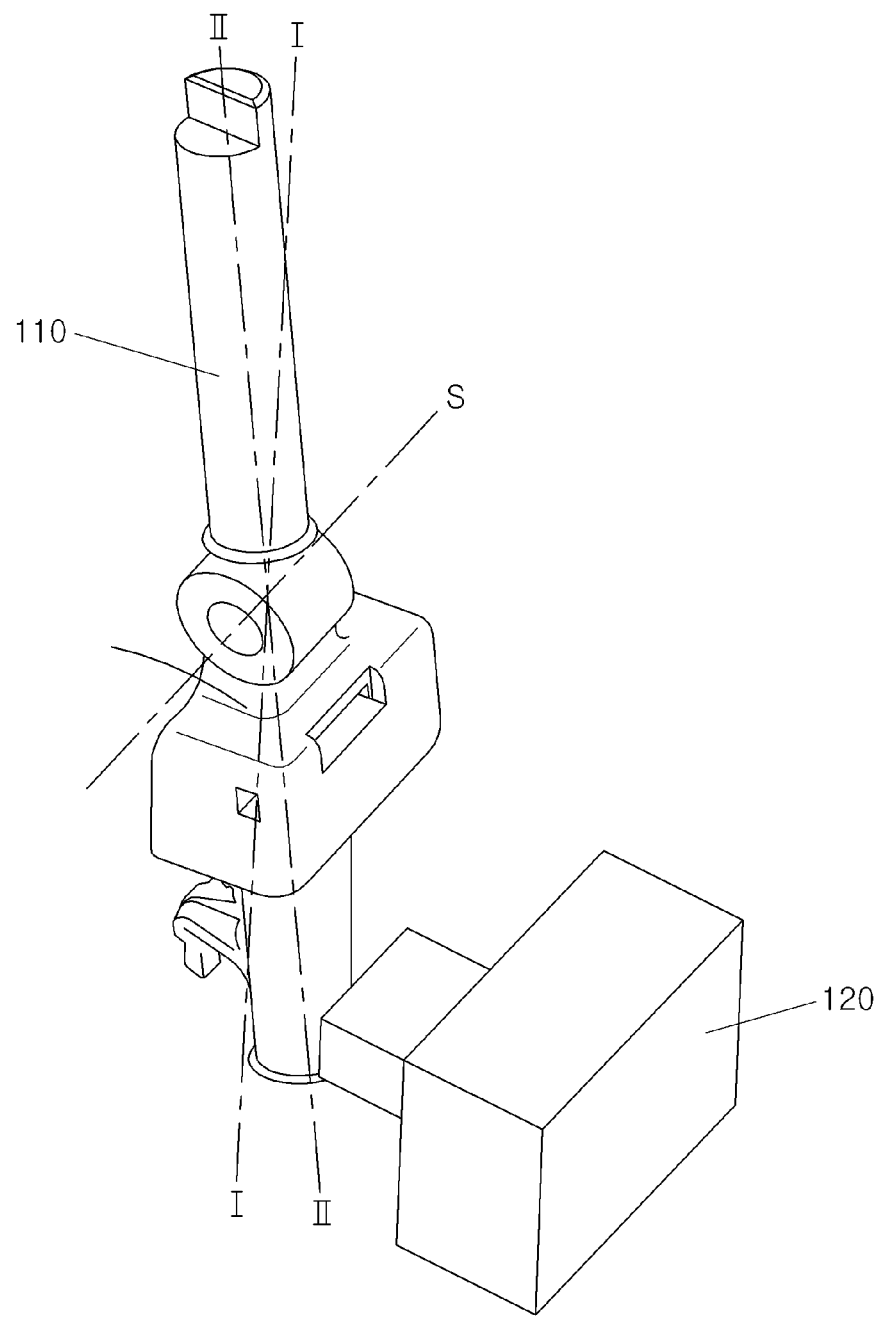
FIG. 1 is a perspective view illustrating main parts of an electronic shift lever according to the related art.
Figure 2:
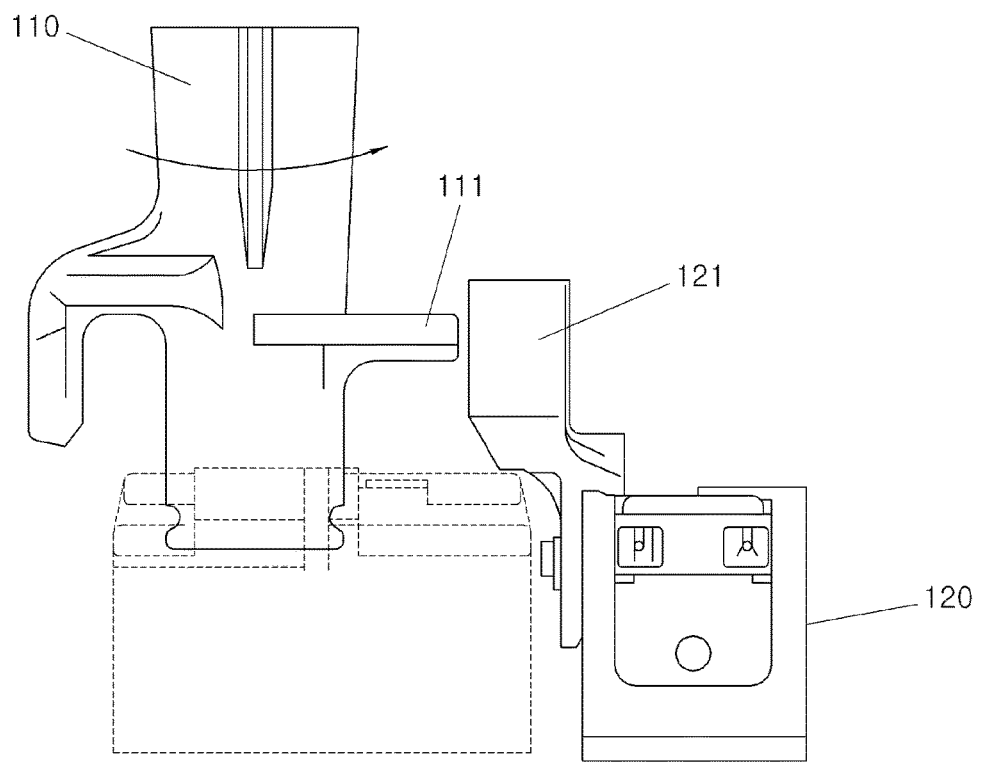
FIG. 2 is a side view illustrating a state in which the electronic shift lever according to the related art is coupled to a select lock along with rotation of the shift lever.
Figure 3:
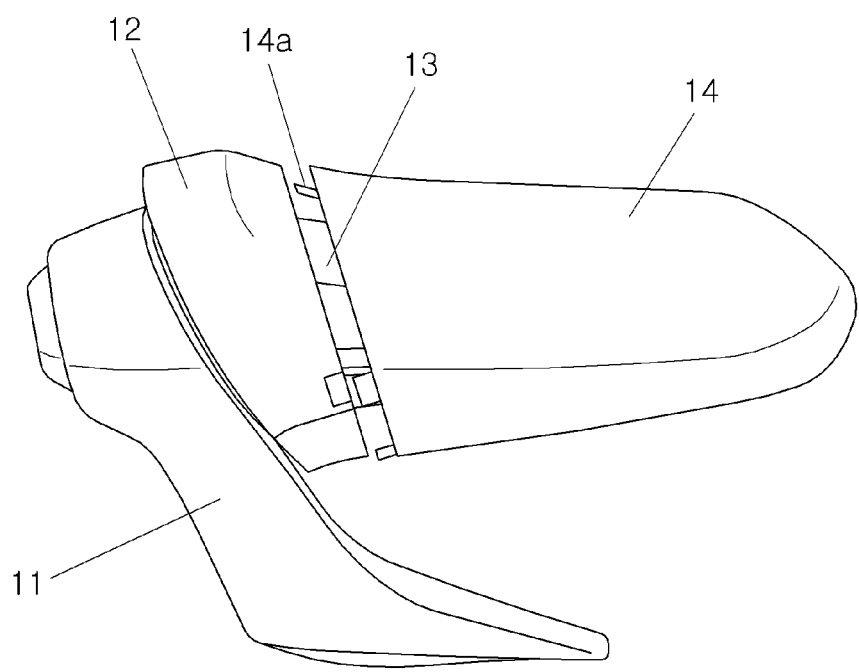
FIG. 3 is a front view illustrating an integrated electronic shift lever assembly for a vehicle according to an embodiment of the present inventive concept.
Figure 4:
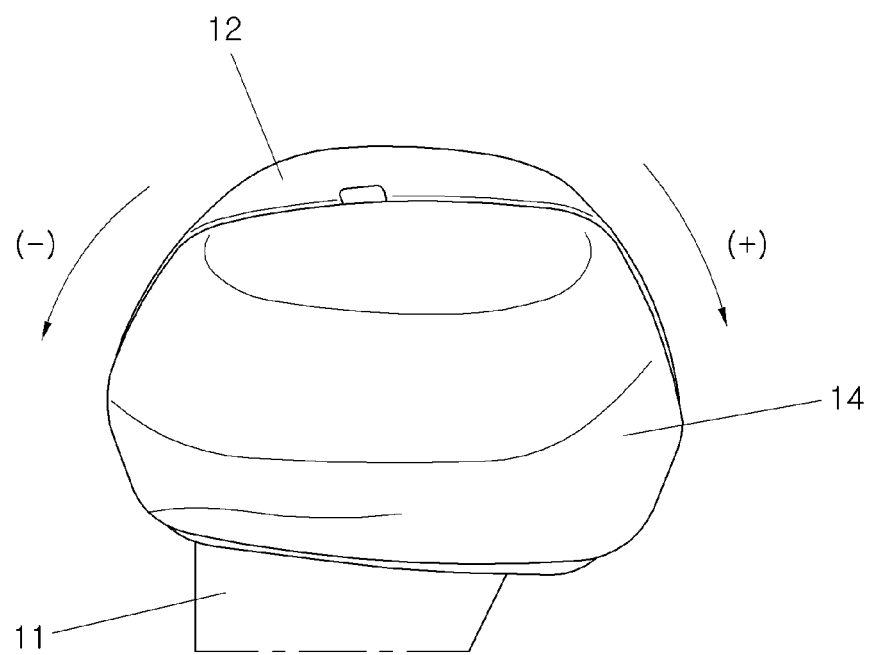
FIG. 4 is a side view illustrating the integrated electronic shift lever assembly for a vehicle according to the embodiment of the present inventive concept.

An integrated electronic shift lever assembly for a vehicle according to exemplary embodiments of the present inventive concept will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

An integrated electronic shift lever assembly for a vehicle according to the present disclosure includes: a shift lever 11 which moves to a predetermined position for a typical shift (P position-R position-N position-D position) operation; a fixed knob 12 which is fixedly installed at an end of the shift lever 11; a shaft 13 which extends in one direction from the fixed knob 12; and a movable knob 14 which is detachably installed to the fixed knob 12, slides along the shaft 13 when the movable knob 14 is decoupled from the fixed knob 12, and rotates about the shaft 13 as an axis of rotation to change a current shift position or a drive mode.

The shift lever 11 is installed at one side of a vehicle interior, such as a console. The shift lever 11 moves in a predetermined position such as a forward and backward direction of a vehicle, for the typical shift operation, so as to perform a typical shift mode in which the shift position is changed to a P-R-N-D position.

The fixed knob 12 is installed at an upper portion of the shift lever 11, and the movable knob 14 is installed at one side of the fixed knob 12.

The shaft 13 extends from the fixed knob 12. One end of the shaft 13 is connected to the fixed knob 12, and another end thereof is perpendicular to a movement direction of the shift lever 11. That is, the shift lever 11 moves in the forward and backward direction of the vehicle, and the shaft 13 is installed in a width direction of the vehicle.

The shaft 13 has a rail 13a formed in a longitudinal direction of the shaft 13.

The movable knob 14 is installed to the shaft 13 so as to move along a formation direction of the shaft 13. The movable knob 14 is provided in a direction perpendicular to an operation direction of the shift lever 11. The movable knob 14 is installed to the shaft so as to slide along the shaft 13. A guide 14b which engages with the rail 13a is formed on an inner side surface of the movable knob 14 so that the movable knob 14 may move in the longitudinal direction of the shaft 13.

In addition, the movable knob 14 rotates about the shaft 13 when the movable knob 14 is spaced apart from the fixed knob 12 by a certain distance.

Accordingly, when the movable knob 14 rotates about the shaft 13 in a state in which the movable knob 14 is decoupled from the fixed knob 12 and moves, an up-shift in which a current shift position is changed to a higher shift position by one step or a down-shift in which a current shift position is changed to a lower shift position by one step may be performed in a manual mode, or a current drive mode may be changed to another drive mode.

The rail 13a of the shaft 13 may be formed in the longitudinal direction (left and right direction in FIG. 8) of the shaft 13 and in a circumferential direction (upward and downward direction in FIG. 8) of the shaft 13. By moving the guide 14b in the rail 13a, the movable knob 14 may slide on the shaft 13 and then rotate about the shaft 13. In this case, the shaft 13 does not rotate, and only the movable knob 14 rotates about the shaft 13.

The integrated electronic shift lever assembly may include a return unit (not shown) which returns the movable knob 14 to an original position after rotation of the movable knob 14 when the movable knob 14 is installed to the shaft 13. That is, the return unit returns the movable knob 14 to an initial position after the movable knob 14 rotates about the shaft 13 in any direction in order to perform the shift operation in the manual mode or change the drive mode.

For example, the return unit may be a coil spring or a torsion spring which is installed between the shaft 13 and the movable knob 14. The movable knob 14 may return after rotating about the shaft 13 by installing both ends of the coil spring or torsion spring to the shaft 13 and the movable knob 14.

Figure 5:
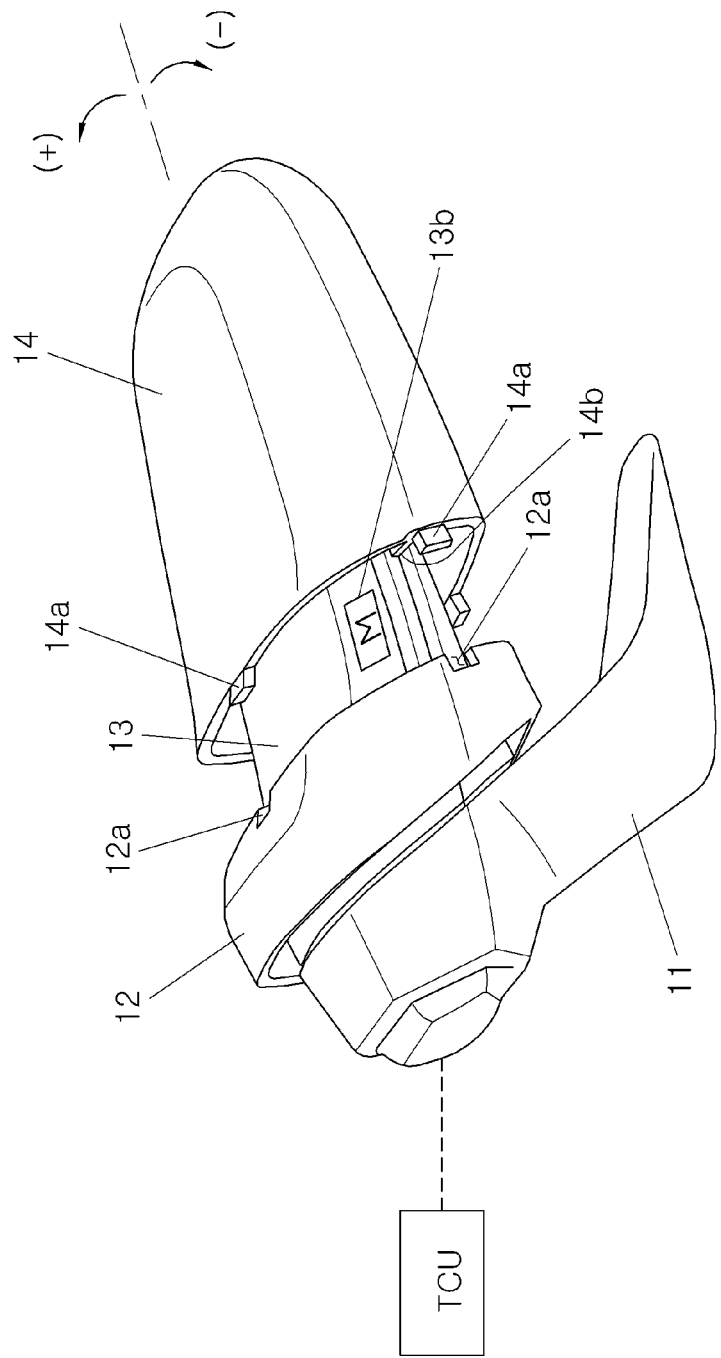
FIG. 5 is a perspective view illustrating a state in which a movable knob is decoupled from a fixed knob in the integrated electronic shift lever assembly for a vehicle according to an embodiment of the present inventive concept.
Figure 6:
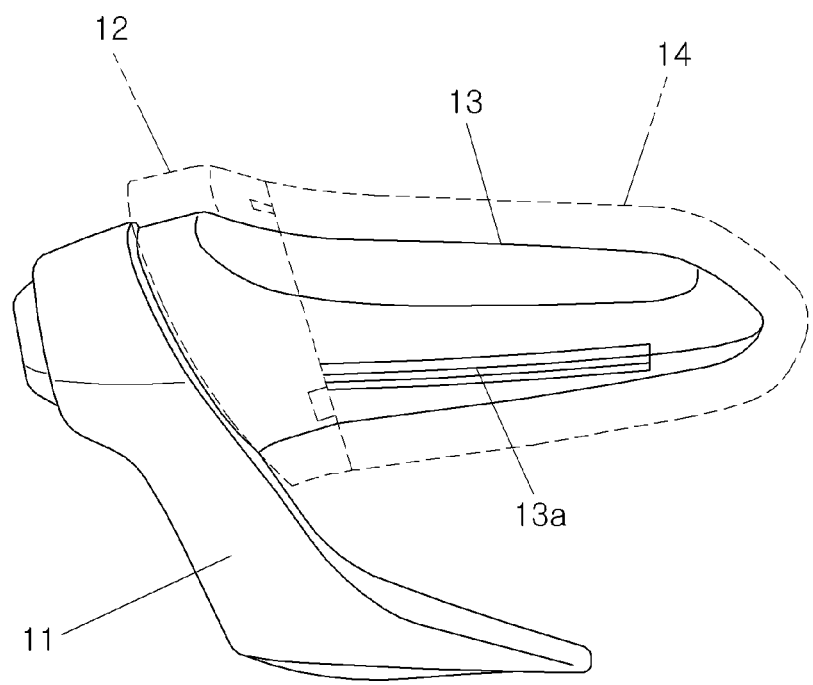
FIG. 6 is a projection view illustrating a shaft in the integrated electronic shift lever assembly for a vehicle according to the embodiment of the present inventive concept.

The integrated electronic shift lever assembly includes a locking unit which restricts the up-shift or down-shift in the manual mode or the change of the drive mode during traveling of the vehicle in a state in which the movable knob 14 is coupled to the fixed knob 12, and enables the up-shift/down-shift or the change of the drive mode in a state in which the movable knob 14 is decoupled from the fixed knob 12. As shown in FIG. 5, the locking unit, for example, may include a locking groove 12*a* formed on the fixed knob 12 and a locking protrusion 14*a* formed on the movable knob 14.

That is, the locking protrusion 14*a* is coupled to the locking groove 12*a* in which the movable knob 14 comes into contact with the fixed knob 12. In this case, since the movable knob 14 does not rotate about the shaft 13, the up-shift (+) or down-shift (−) may not perform in the manual mode or the current drive mode may not change to another drive mode.

The shaft 13 or the movable knob 14 includes a rotation recognition unit for detecting a rotation status and a rotation direction of the movable knob 14 about the shaft 13. Since the rotation recognition unit detects the rotation status and the rotation direction of the movable knob 14, two rotation recognition units may be provided so as to detect rotation of the movable knob 14 in different directions.

The rotation recognition unit, for example, may be one of a Hall IC which is an integrated circuit used for contactless displacement detection and is integrated by assembling a Hall device or an amplifier in a silicon chip, a tact switch or a rubber switch which is a type of push type switches, a proximity sensor, and the like.

Figure 7:
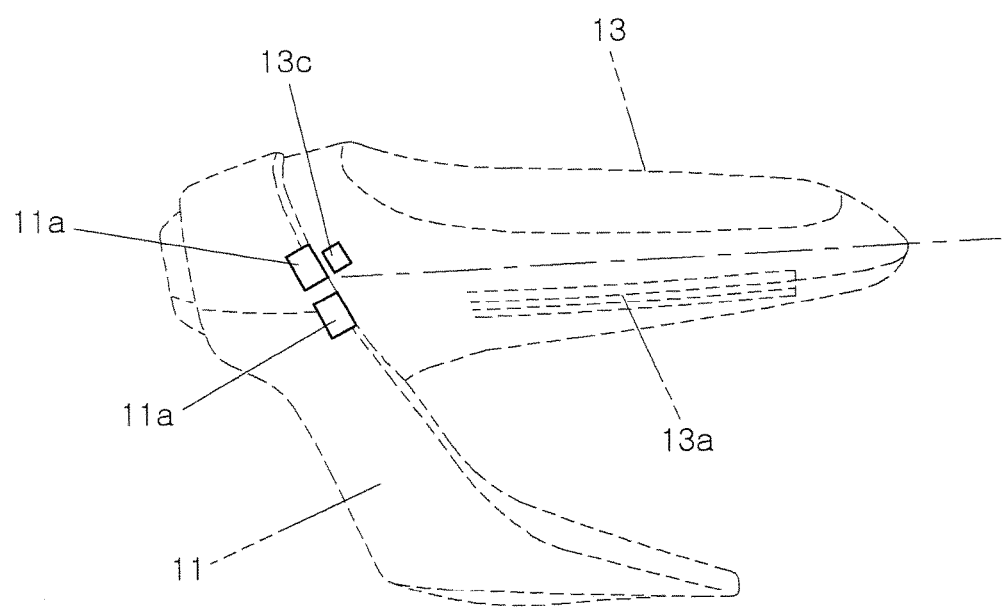
FIG. 7 is a projection view illustrating a state in which the shaft has contacts and the movable knob has a contactor in the integrated electronic shift lever assembly for a vehicle according to an embodiment of the present inventive concept.
Figure 8:
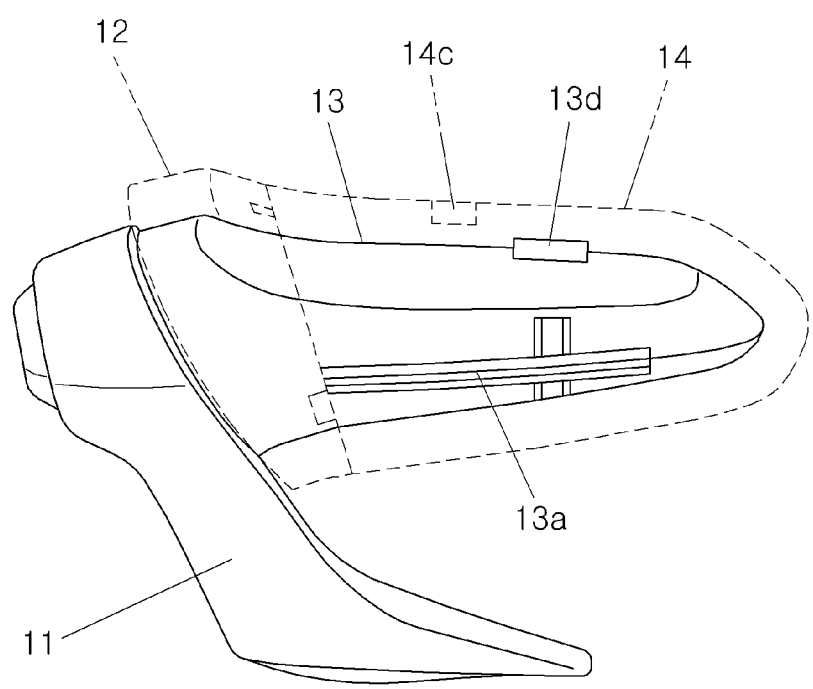
FIG. 8 is a view schematically illustrating a relation between the contacts and the contactor in FIG. 7.
Figure 9:
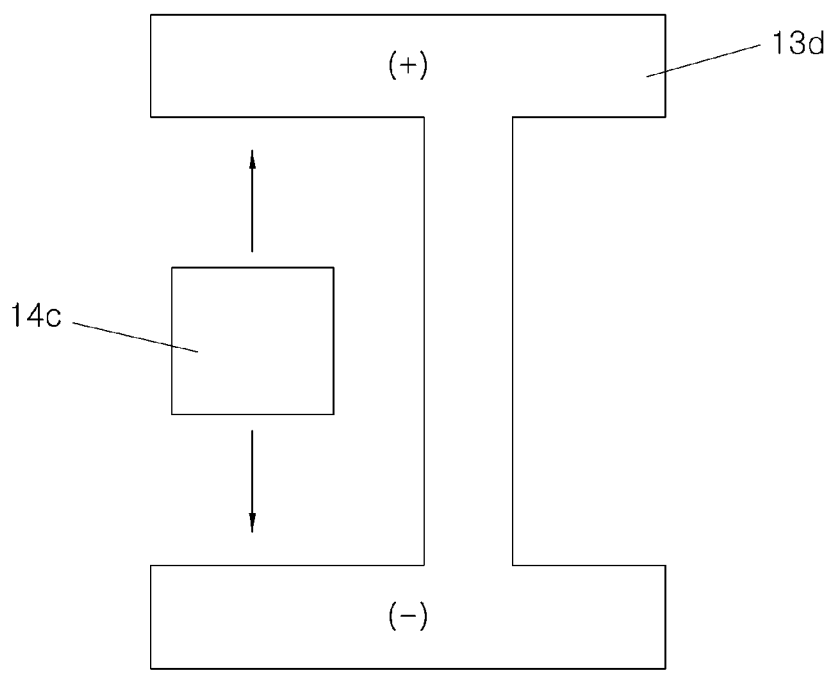
FIG. 9 is a projection view illustrating an example in which the shaft rotates in the integrated electronic shift lever assembly for a vehicle according to an embodiment of the present inventive concept.

For example, referring to FIG. 7-9, the rotation recognition unit includes a contactor 14*c* installed on an inner side surface of the movable knob 14, and (+) and (−) contacts 13*d* installed on an outer side surface of the shaft 13. The contactor 14*c* comes into contact with the (+) contact or the (−) contact according to the rotation of the movable knob 14 so as to generate signals according to the rotation of the movable knob 14. On the other hand, the contactor 14*c* may also be installed at the shaft 13 and the contacts 13*d* may also be installed at the movable knob 14.

In addition, the shaft 13 may include an indicator 13*b* for displaying a current shift position or a current drive mode when the movable knob 14 is decoupled from the fixed knob 12.

The shaft 13 may also rotate about the fixed knob 12, as shown in FIG. 9. In this case, the shaft 13 returns to an original position after rotation by respectively connecting both ends of the return unit such as a coil spring or a torsion spring to the shaft 13 and the fixed knob 12.

The rotation recognition unit may be installed at one side of each of the fixed knob 12 and the shaft 13 for recognizing rotation of the shaft 13. For example, when the fixed knob 12 has a PCB 11*a* having a Hall sensor and the shaft 13 has a magnet 13*c*, the Hall sensor may detect the rotation of the shaft 13.

The operation of the integrated electronic shift lever assembly for a vehicle according to the present disclosure having the above configuration will be described.

The integrated electronic shift lever assembly for a vehicle according to the present disclosure may perform the typical shift mode by operating the assembly of the fixed knob 12 and the movable knob 14 and operating the shift lever 11 in the forward and backward direction of the vehicle in the state in which the movable knob 14 is coupled to the fixed knob 12. Here, the typical shift mode means that the shift operation is performed such that one of the P position, the R position, the N position, and the D position is selected.

In order to perform a change from the typical shift mode to the manual mode, the movable knob 14 moves in the width direction of the vehicle along the shaft 13 and is decoupled from the fixed knob 12.

When the movable knob 14 is spaced apart from the fixed knob 12 by a certain distance, the typical shift mode is changed to the manual mode. The manual mode serves to shift the transmission according to a driver's intention, and the up-shift or the down-shift for changing a current shift position to a higher or lower shift position by one step may be performed.

That is, when a driver rotates the movable knob 14, the up up-shift or the down-shift is performed according to the rotation of the movable knob 14. Thus, it is possible to give a dynamic driving feeling to the driver.

In this case, since the current shift position of the traveling vehicle is displayed on the indicator 13*b* installed at the shaft 13 by movement of the movable knob 14, the driver may perform a shift operation with reference to the displayed shift position.

Accordingly, the driver may perform the up-shift or down-shift of the shift position of the direct traveling vehicle by two step operations, for example, an operation of sliding the movable knob 14 such that the movable knob 14 is decoupled from the fixed knob 12 and an operation of rotating the movable knob 14 about the shaft 13.

A process of changing the drive mode of the traveling vehicle is performed by two steps.

That is, when the driver changes the drive mode, the driver first slides the movable knob 14 along the shaft 13 such that the movable knob 14 is decoupled from and is spaced apart from the fixed knob 12 by a certain distance.

When the movable knob 14 is decoupled from the fixed knob 12, the driver may drive the vehicle in a desired drive mode. The drive mode may include a normal mode, an eco mode in which the vehicle travels with high fuel-efficiency, a sport mode in which the vehicle dynamically travels, a snow mode in which the vehicle travels on the snowy road, and the like. The above drive modes may be sequentially selected according to the rotation of the movable knob 14. The order of the drive mode is reversed when the movable knob 14 rotates in the opposite direction.

In accordance with an integrated electronic shift lever assembly for a vehicle according to the present disclosure, a typical shift mode can be performed by operating a shift lever in a state in which a fixed knob is coupled to a movable knob, and an up-shift (+) or a down-shift (−) can be performed by rotating a movable knob in a state in which the movable knob is decoupled from the fixed knob and the shift lever enters a manual mode.

In addition, in the typical shift mode, a drive mode of a traveling vehicle can be easily changed.

In addition, since the number of components constituting the integrated electronic shift lever assembly and thus the size thereof are reduced, it is possible to achieve reduction in weight and production cost.

In addition, performance can be improved by entering and returning from the manual mode with respect to the typical shift mode and an up/down-shift operation.

While the invention has been described with respect to the specific embodiments, it will be apparent to those skilled in the art that various changes and modifications may be made without departing from the spirit and scope of the invention as defined in the following claims.

What is claimed is:

1. An integrated electronic shift lever assembly for a vehicle, comprising:
    a shift lever installed inside the vehicle and operated by a driver for a shift position operation;
    a fixed knob fixedly attached to an end of the shift lever;
    a shaft extending outwards from the fixed knob; and
    a movable knob detachably connected to the fixed knob such that the movable knob slides along the shaft to be decoupled from the fixed knob and rotates about the fixed knob,
    wherein when a signal according to a rotational direction of the movable knob is input to a transmission control unit (TCU), the TCU changes a shift position or a drive mode,
    wherein the integrated electronic shift lever assembly further includes a locking unit, which prevents rotation of the movable knob and locks the movable knob to the fixed knob, at a contact portion between the fixed knob and the movable knob, and
    wherein the shaft is rotatably mounted to the fixed knob and the movable knob rotates along with the shaft.

2. The integrated electronic shift lever assembly of claim 1, wherein the movable knob rotates about the shaft which is fixedly mounted to the fixed knob.

3. The integrated electronic shift lever assembly of claim 1, wherein when the movable knob rotates, the shift position is changed to a higher or lower shift position than a current shift position.

4. The integrated electronic shift lever assembly of claim 1, wherein when the movable knob rotates, the drive mode is selected.

5. The integrated electronic shift lever assembly of claim 4, wherein the drive mode includes a normal mode, an economy mode, a manual mode, and a snow mode.

6. The integrated electronic shift lever assembly of claim 1, wherein the locking unit comprises:
    a locking groove grooved on the fixed knob; and
    a locking protrusion protruding on the movable knob to be inserted into the locking groove.

7. The integrated electronic shift lever assembly of claim 1, wherein a rotation recognition unit for recognizing rotation of the movable knob is provided in the shaft or the movable knob.

8. The integrated electronic shift lever assembly of claim 7, wherein the rotation recognition unit is provided in plural numbers to recognize the rotation of the movable knob according to the rotational direction of the movable knob and to be operated according to the rotational direction of the movable knob.

9. The integrated electronic shift lever assembly of claim 7, wherein the rotation recognition unit is a Hall-effect sensor.

10. The integrated electronic shift lever assembly of claim 7, wherein the rotation recognition unit is a proximity sensor.

11. The integrated electronic shift lever assembly of claim 7, wherein the rotation recognition unit comprises:
    a contactor installed on one of the movable knob and the shaft; and
    contacts installed on the other of the movable knob and the shaft, the contacts which come into contact with the contactor according to the rotational direction of the movable knob so that the signal according to the rotational direction of the movable knob is output therefrom.

12. The integrated electronic shift lever assembly of claim 1, wherein:
    the shaft has a rail in a longitudinal direction of the shaft;
    the movable knob has a guide on an inner side surface thereof and engaged with the rail; and
    the movable knob moves in the longitudinal direction of the shaft.

13. The integrated electronic shift lever assembly of claim 1, wherein the shaft further comprises an indicator exposed to outside when the movable knob is decoupled from the fixed knob to display the shift position or the drive mode.

14. The integrated electronic shift lever assembly of claim 1, wherein the shift position includes Park position, Reverse position, Neutral position, and Drive position.

* * * * *